United States Patent [19]
Lee et al.

[11] Patent Number: 6,131,919
[45] Date of Patent: Oct. 17, 2000

[54] METHOD OF AUTOMATICALLY ADJUSTING A BODY OF A TRACTOR TO A HORIZONTAL POSITION AND APPARATUS FOR PERFORMING THE SAME

[75] Inventors: Sang Sik Lee; Kie Seok Oh, both of Kyungki-do, Rep. of Korea

[73] Assignee: LG Cable, Ltd., Seoul, Rep. of Korea

[21] Appl. No.: 09/344,199

[22] Filed: Jun. 24, 1999

[30] Foreign Application Priority Data

Nov. 10, 1998 [KR] Rep. of Korea ...................... 98-47935

[51] Int. Cl.⁷ ..................................................... B60P 1/16
[52] U.S. Cl. ........................................... 280/6.154; 180/41
[58] Field of Search ............................. 280/6.154, 6.155; 180/41

[56] References Cited

U.S. PATENT DOCUMENTS

| | | | |
|---|---|---|---|
| 3,309,097 | 3/1967 | Seeber | 280/6.154 |
| 3,480,098 | 11/1969 | Ward, Jr. | 280/6.154 |
| 3,713,617 | 1/1973 | Bogdan et al. | 248/371 |
| 3,792,748 | 2/1974 | Regier | 280/6.154 |
| 3,806,141 | 4/1974 | Louis et al. | 280/6.154 |
| 5,538,264 | 7/1996 | Brown et al. | 280/6.1 |
| 5,538,266 | 7/1996 | Martin et al. | 280/6.154 |

*Primary Examiner*—Kenneth R. Rice
*Attorney, Agent, or Firm*—Cantor Colburn LLP

[57] ABSTRACT

Disclosed is a method of adjusting a tractor to a horizontal position and an apparatus for performing the same. The method comprises the steps of determining whether or not the tractor is in an automatic mode, determining whether the tractor is in a flat land or in a slope land if the tractor is in the automatic mode, adjusting a height of the body with respect to a ground if the tractor is in the flat land, determining a driving direction of the tractor if the tractor is in the slope land, adjusting the body to the horizontal position by controlling the body in left and right directions thereof if the tractor is driving in a contour direction, adjusting the body to the horizontal position by controlling the body in front and rear directions thereof if the tractor is driving in a latitudinal direction, and adjusting the body to the horizontal position by controlling the body in front, rear, left and right directions thereof if the tractor is driving in an oblique direction. The body of the tractor can be maintained to the horizontal position while the tractor is driving and the height of the body with respect to the ground can be adjusted, so the crops can be prevented from being damaged. The apparatus can rapidly adjust the body of the tractor to the horizontal position.

14 Claims, 11 Drawing Sheets

METHOD OF AUTOMATICALLY ADJUSTING A BODY OF A TRACTOR TO A HORIZONTAL POSITION AND APPARATUS FOR PERFORMING THE SAME

BACKGROUND OF THE INVENTION

1. Field of the Invention

The present invention relates to a tractor, and more particularly to a method of automatically adjusting a body of a tractor to a horizontal position and an apparatus for performing the same, in which a body of the tractor driving in a slope land can be maintained in the horizontal position and a height of the body with respect to a ground can be adjusted according to a ground condition.

2. Prior Arts

Generally, when doing farm work in a flat land by using a tractor, the body of the tractor maintains in a horizontal state, so it is not required to adjust the position of the body of the tractor. However, when doing farm work in a slope land, the body of the tractor is inclined due to the ground condition, so it is uncomfortable to the user to drive the tractor. In addition, when doing farm work in a land having a lot of growing crops, the body of the tractor makes contact with the crops, so the crops are damaged by the body of tractor.

Therefore, when the tractor is driving in the slope land for doing farm work, it is required to adjust the position of the body of the tractor such that the body of the tractor can be maintained in the horizontal position. In addition, it is required to lift the body of tractor if the crops make contact with the body of the tractor.

Conventionally, the tractor is provided with a position controlling apparatus for adjusting the height of the body with respect to the ground according to the ground condition. For example, there is provided a system for controlling a seat of the tractor by which the seat can be maintained in a horizontal state even when the body of the tractor is inclined. However, a driver in this system cannot sense an inclined degree of the tractor so that, in extreme case, the tractor can be turned over.

In addition, there is provided a buzzer system which alarms to the driver when the tractor is driving in the slope land. However, the buzzer system is unsuitable when it is required to work in the high-slope land.

In the meantime, there is provided a tractor having an apparatus which adjusts the body of the tractor to the horizontal position. The tractor also has an apparatus which operates actuators based on data sent from a slope detecting apparatus in which one actuator is a basis for controlling a position of the tractor and the other actuator is operated to maintain the body of the tractor in the horizontal position.

When a control signal simultaneously ordering move-up and move-down is applied to the actuators, the actuators do not operate. However, this kind of apparatus can not rapidly adjust the body of the tractor to the horizontal position if the body is inclined while the tractor is driving.

SUMMARY OF THE INVENTION

The present invention has been made to overcome the above described problems of the prior arts, and accordingly, it is a first object of the present invention to provide a method of automatically adjusting a body of a tractor to a horizontal position in which a body of the tractor can be maintained in the horizontal position while the tractor is driving in a slope land and a height of the body with respect to a ground can be adjusted according to a ground condition.

A second object of the present invention is to provide an apparatus for performing the method.

To achieve the first object, the present invention provides a method of adjusting a body of a tractor to a horizontal position, the method comprising the steps of:

(1) determining whether the tractor is in an automatic mode or in a manual mode; (2) operating the tractor with the manual mode if the tractor is in the manual mode in step (1); (3) determining whether the tractor is in a flat land or in a slope land if the tractor is in the automatic mode in step (1); (4) adjusting a height of the body of the tractor with respect to the ground by operating a height button according to a ground condition if the tractor is in the flat land in step (3); (5) determining a driving direction of the tractor if the tractor drives in the slope land in step (3); (6) adjusting the body to the horizontal position by controlling the body in left and right directions thereof if the tractor is driving in a contour direction in step (5); (7) adjusting the body to the horizontal position by controlling the body in front and rear directions thereof if the tractor is driving in a latitudinal direction in step (5); and (8) adjusting the body to the horizontal position by controlling the body in left, right, front and rear directions thereof if the tractor is driving in an oblique direction in step (5).

According to the preferred embodiment of the present invention, step (6) comprises the substeps of measuring an inclined angle of the body in left and right directions thereof by using a slope detecting sensor, calculating displacements of first and second cylinders which are provided at front and rear wheel axles, determining a voltage corresponding to the displacements, sending the voltage to a driving circuit thereby selectively operating first and second cylinders so as to allow the body of the tractor to be maintained in the horizontal position, determining whether or not the tractor still drives in the contour direction and repeating the substeps if the tractor still drives in the contour direction.

Step (7) comprises the substeps of measuring an inclined angle of the body in front and rear directions thereof by using a slope detecting sensor, calculating displacements of first and second cylinders which are provided at front and rear wheel axles, converting a displacement value to a voltage, sending the voltage to a driving circuit thereby selectively operating first and second cylinders so as to allow the body of the tractor to be maintained in the horizontal position, determining whether or not the tractor still drives in the latitudinal direction, and repeating the substeps if the tractor still drives in the latitudinal direction.

Step (8) comprises the substeps of measuring an inclined angle of the body in left, light, front and rear directions thereof by using a slope detecting sensor, calculating displacements of first and second cylinders which are provided at front and rear wheel axles, converting a displacement value to a voltage, sending the voltage to a driving circuit thereby selectively operating first and second cylinders so as to allow the body of the tractor to be maintained in the horizontal position, determining whether or not the tractor still drives in the oblique direction, and repeating the substeps if the tractor still drives in the oblique direction.

To achieve the second object, the present invention provides an apparatus for adjusting a body of a tractor to a horizontal position, the apparatus comprising: a driving circuit generating an electric signal for operating the body and a steering cylinder; a first hydraulic pressure supplying section connected to the driving circuit for controlling the body of the tractor; a second hydraulic pressure supplying section connected to the driving circuit for controlling a driving direction of the tractor; a front cylinder section including a first front wheel cylinder and a second front wheel cylinder, the front cylinder section being connected to the first hydraulic pressure supplying section, the first front wheel cylinder being disposed between a first idle gear portion which is rotatably coupled to a first end of a front wheel axle and a first end of a first bracket horizontally installed on a front portion of the body, the second front wheel cylinder being disposed between a second idle gear portion which is rotatably coupled to a second end of the front wheel axle and a second end of the first bracket; a rear cylinder section including a first rear wheel cylinder and a second rear wheel cylinder, the rear cylinder section being connected to the first hydraulic pressure supplying section, the first rear wheel cylinder being disposed between a third idle gear portion which is rotatably coupled to a first end of a rear wheel axle and a first end of a second bracket horizontally installed on a rear portion of the body, the second rear wheel cylinder being disposed between a fourth idle gear portion which is rotatably coupled to a second end of the rear wheel axle and a second end of the second bracket; a steering cylinder which is connected to second hydraulic pressure supplying section and is installed on a front portion of the front wheel axle; a slope detecting sensor provided at the body, the slope detecting sensor detecting an incline of the body according to a ground condition; cylinder displacement detecting sensors installed at both front and rear cylinder sections for detecting displacements thereof; and microcomputer which is installed in the body and is connected to the cylinder displacement detecting sensors and the slope detecting sensor for controlling the operations of the steering cylinder and the front and rear cylinder sections.

According to the preferred embodiment of the present invention, the first hydraulic pressure supplying section comprises a hydraulic pump installed in an oil tank for supplying a pressurized oil to the front and rear cylinder sections, an exhaust valve connected to the hydraulic pump through a first pipe for adjusting a flow rate of the oil which flows into the front and rear cylinder sections through the first pipe, and a solenoid valve assembly connected to the exhaust valve by second and third pipes for allowing the oil supplied from the hydraulic pump to flow into front and rear portions of pistons which are parts of front and rear cylinder sections.

BRIEF DESCRIPTION OF THE DRAWINGS

The above objects and other advantages of the present invention will become more apparent by describing in detail the preferred embodiment thereof with reference to the attached drawings, in which.

DESCRIPTION OF THE PREFERRED EMBODIMENT

Hereinafter, the present invention will be described in detail with reference to the accompanying drawings.

Figure 1:
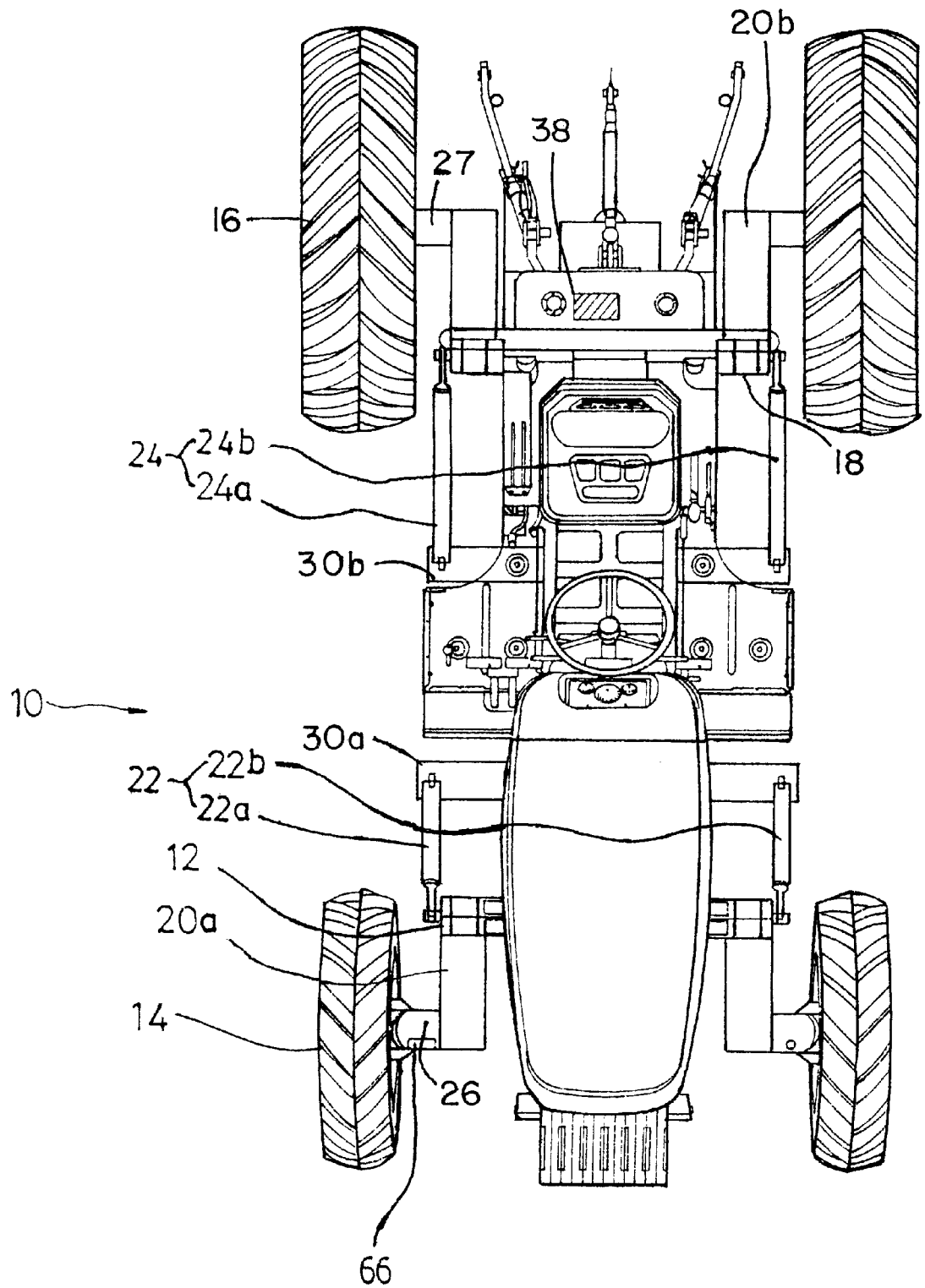
FIG. 1 is a schematic plan view showing the structure of the tractor according to one embodiment of the present invention.
Figure 2:
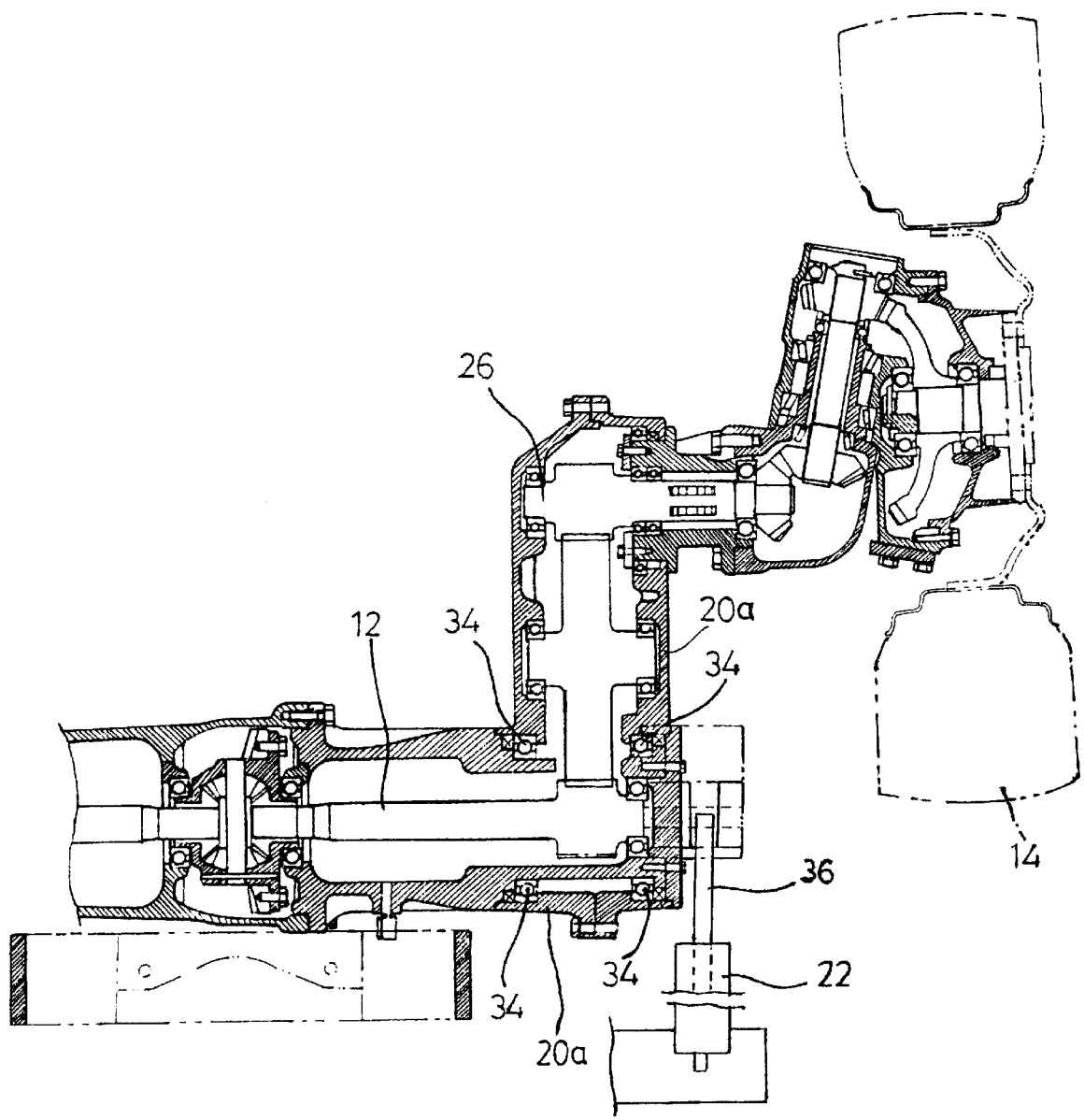
FIG. 2 is a sectional view showing a front cylinder section installed on a front wheel of the tractor according to the present invention.
Figure 3:
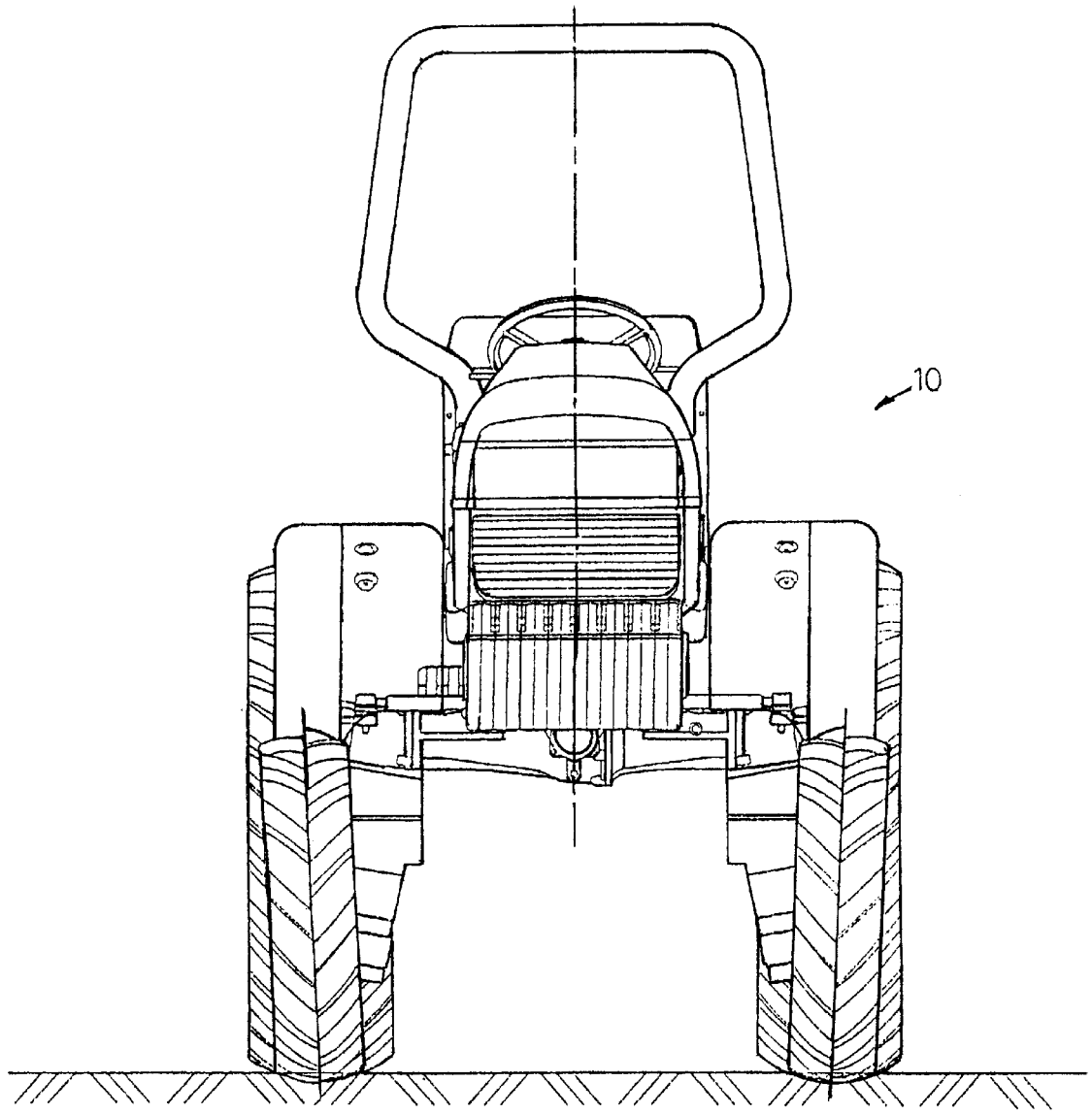
FIG. 3 is a front view of the tractor in which a body of the tractor raises from the ground.
Figure 4:
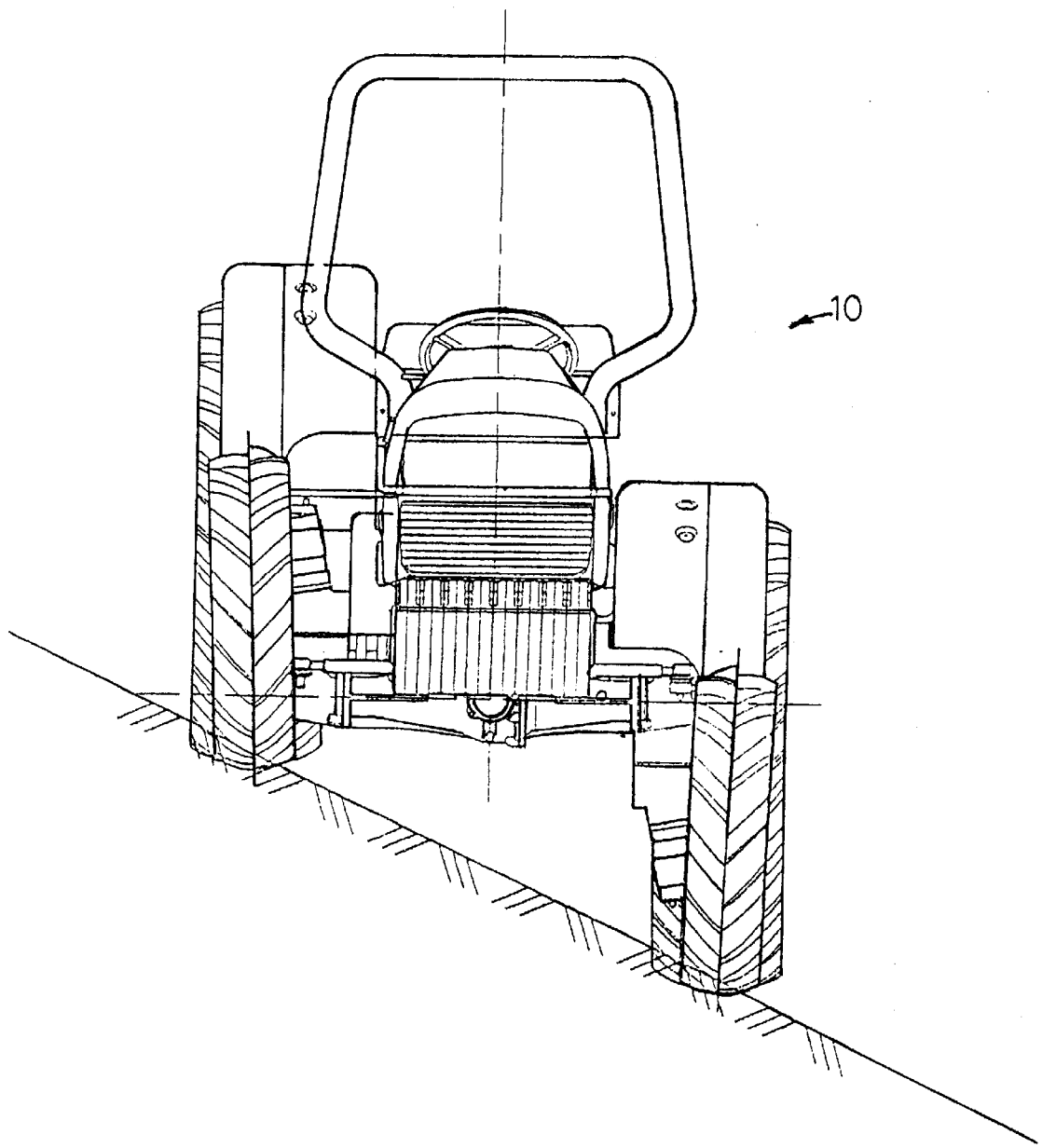
FIG. 4 is a front view of the tractor when the tractor is driving in a contour direction.
Figure 5:
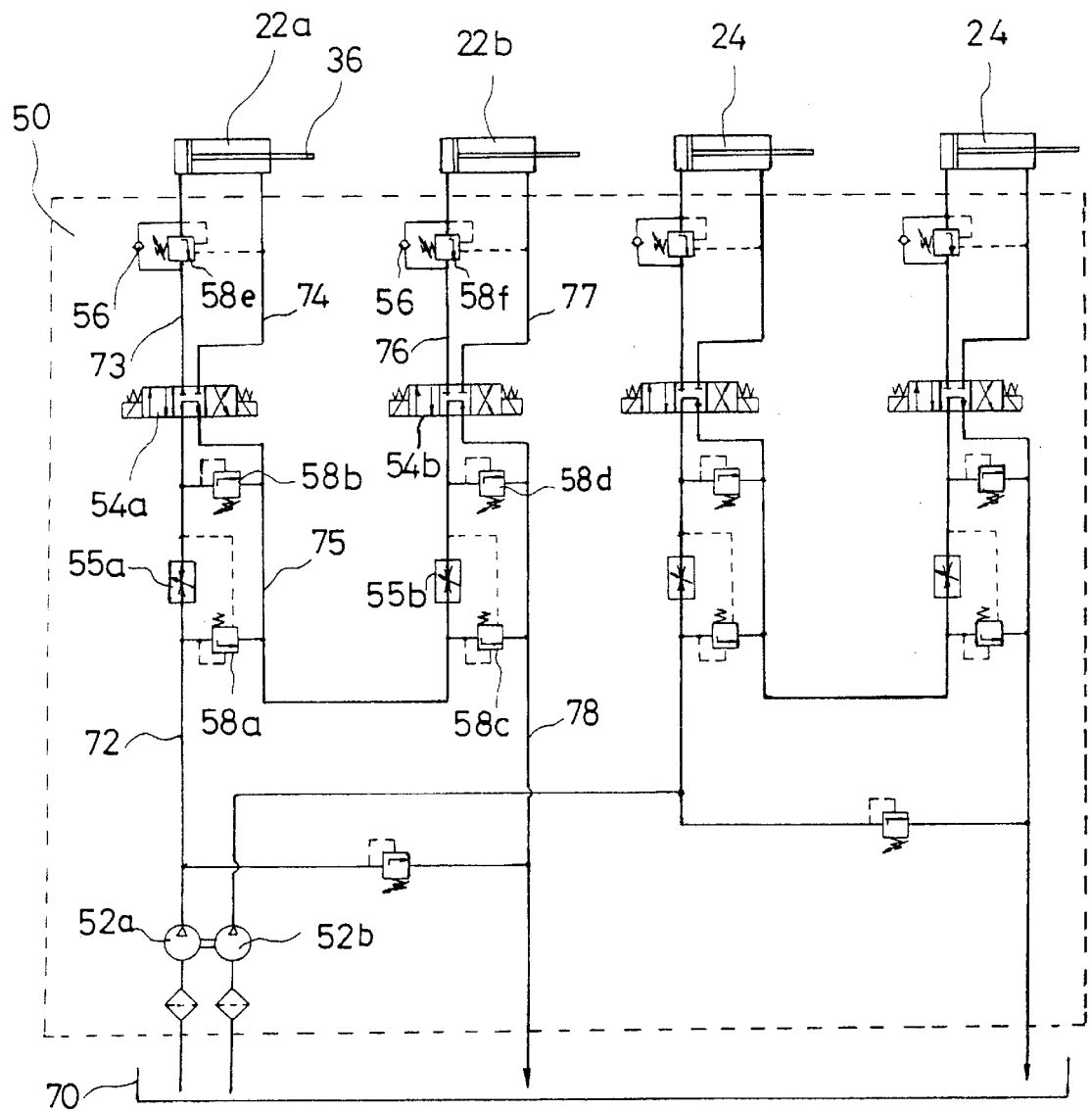
FIG. 5 is a schematic view showing a hydraulic pressure supplying section of the tractor according to the present invention.
Figure 6:
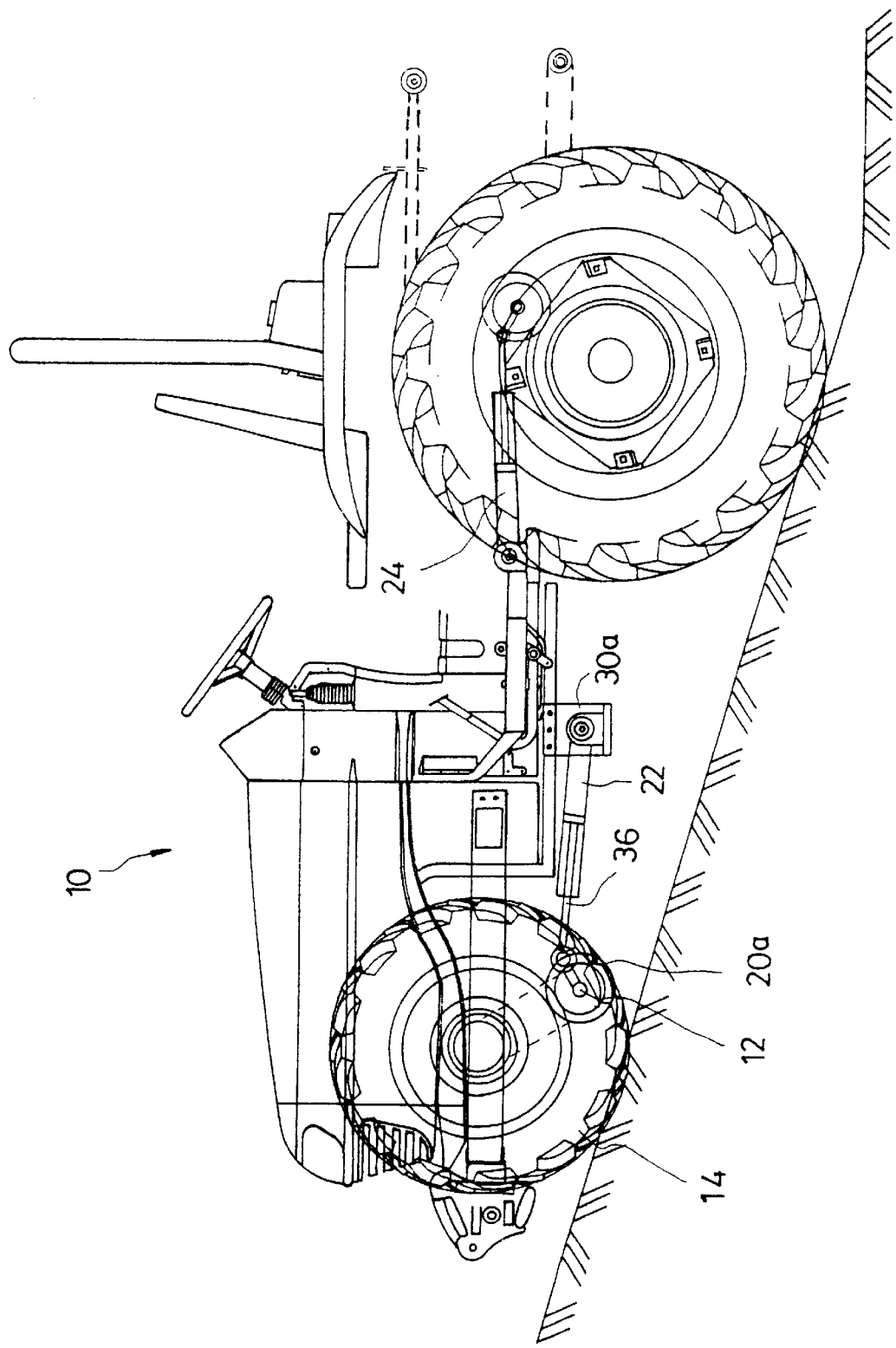
FIG. 6 is a side view of the tractor when the tractor is driving in a latitudinal direction.
Figure 7:
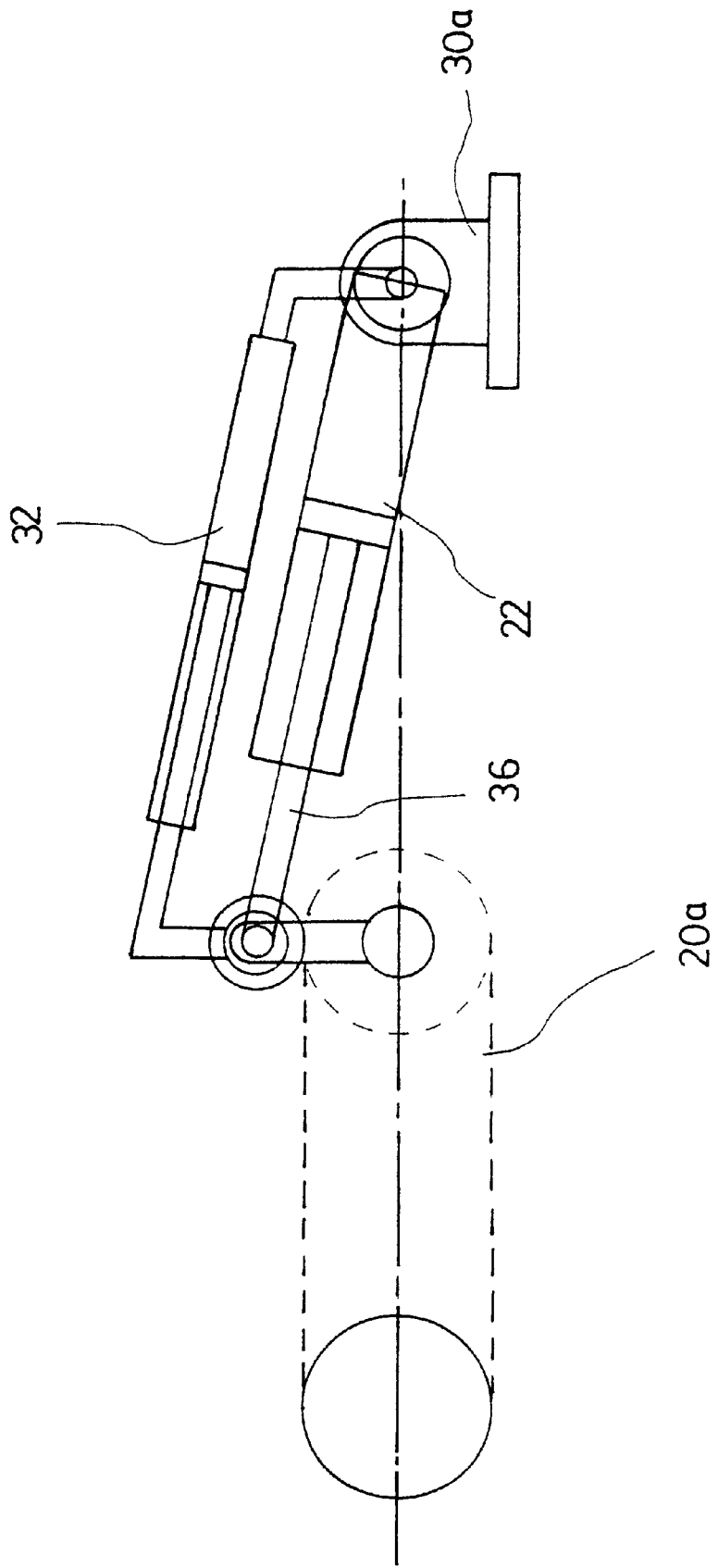
FIG. 7 is a schematic view showing a cylinder displacement detecting sensor installed on the tractor according to the present invention.
Figure 8:
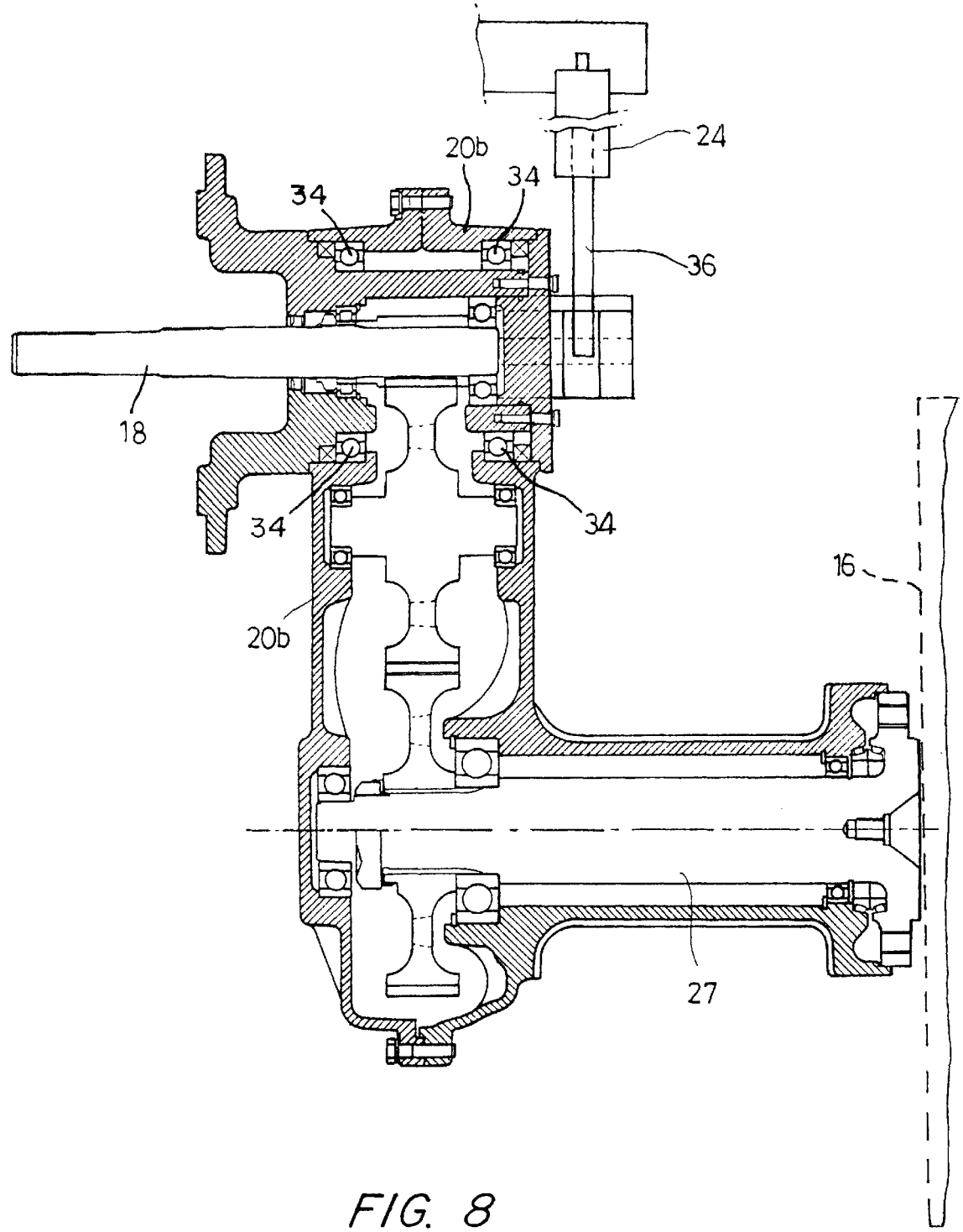
FIG. 8 is a sectional view showing a rear cylinder section installed on a rear wheel of the tractor according to the present invention.
Figure 9:
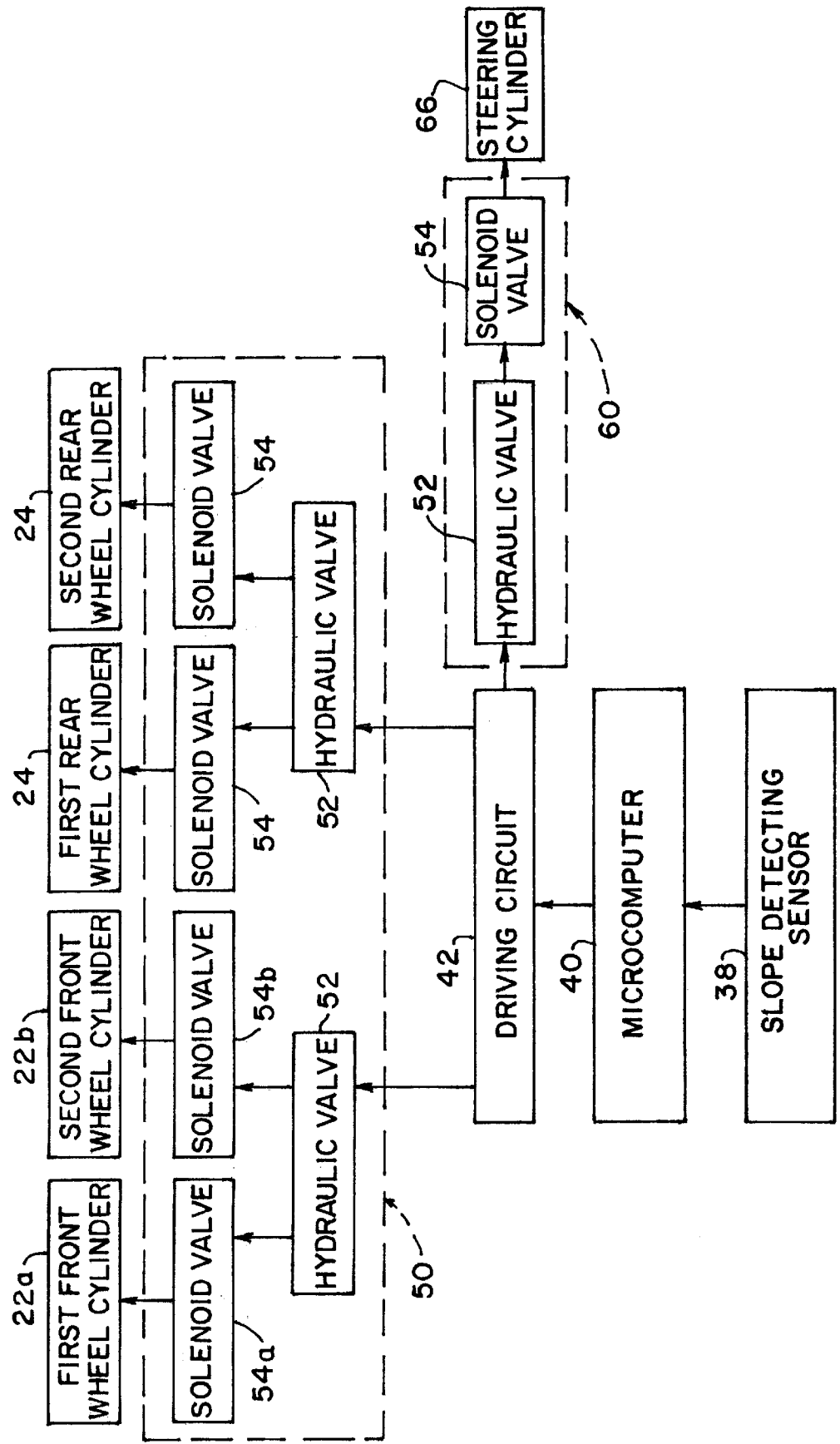
FIG. 9 is a block diagram schematically showing an operation of the tractor according to the present invention.
Figure 10:
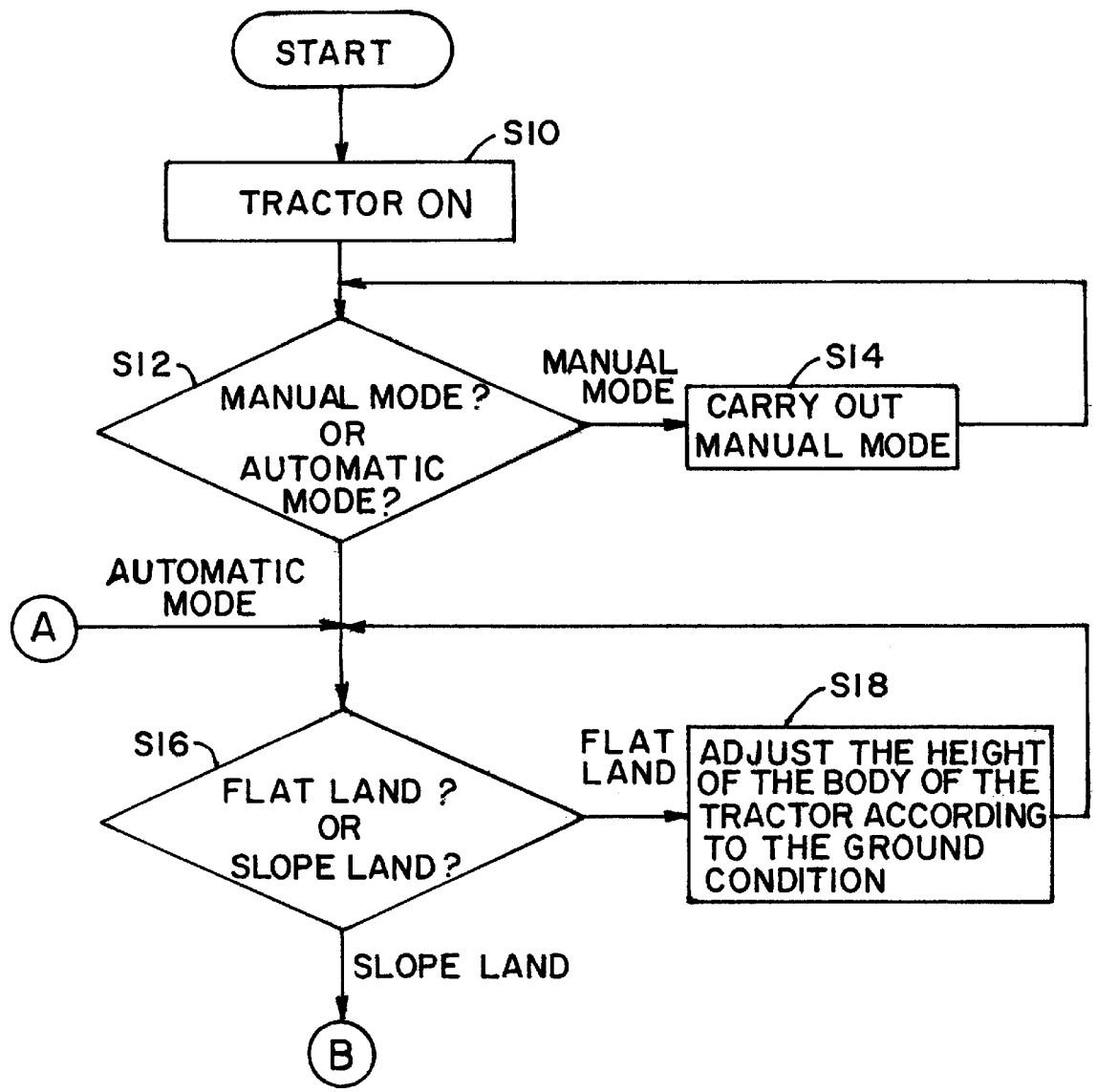
FIG. 10 is a flow chart showing an operating process of the tractor according to the present invention.

FIG. 1 is a schematic plan view showing the structure of the tractor according to one embodiment of the present invention, FIG. 2 is a sectional view showing a front cylinder section installed on a front wheel of the tractor according to the present invention, FIG. 3 is a front view of the tractor in which a body of the tractor raises from the ground, FIG. 4 is a front view of the tractor when the tractor is driving in a contour direction, FIG. 5 is a schematic view showing a hydraulic pressure supplying section of the tractor according to the present invention, FIG. 6 is a side view of the tractor when the tractor is driving in a latitudinal direction, FIG. 7 is a schematic view showing a cylinder displacement detecting sensor installed on the tractor according to the present invention, FIG. 8 is a sectional view showing a rear cylinder section installed on a rear wheel of the tractor according to the present invention, FIG. 9 is a block diagram schematically showing an operation of the tractor according to the present invention, and FIG. 10 is a flow chart showing an operating process of the tractor according to the present invention.

Referring to FIGS. 1 to 9, a body of a tractor 10 is provided at a center thereof with a driving shaft (not shown). A front wheel axle 12 having end portions to which front wheels 14 are coupled is provided at a front of the driving shaft and a rear wheel axle 18 having end portions to which rear wheels 16 are coupled is provided at a rear of the diving shaft. Idle gear portions 20a and 20b are attached to both ends of front wheel axle 12 and rear wheel axle 18 at a right angle. In order to allow idle gear portions 20a and 20b to rotate, there are provided ball bearings 34. That is, ball bearings 34 are disposed between idle gear portions 20a and 20b and front wheel axle 12 and rear wheel axle 18 so that idle gear portions 20a and 20b can easily rotate about front wheel axle 12 and rear wheel axle 18. In addition, a front cylinder section 22 having a first front wheel cylinder 22a and a second front wheel cylinder 22b and a rear cylinder section 24 having first rear wheel cylinder 24a and a second rear wheel cylinder 24b are attached to idle gear portions 20a and 20b, respectively, in such a manner that their centers are offset by a predetermined distance apart from centers of front wheel axle 12 and rear wheel axle 18. Front wheels 14 and rear wheels 16 are coupled to idle gear portions 20a and 20b by means of front axles 26 and rear axles 27. When pistons of front cylinder section 22 and rear cylinder section 24 carry out an expansion cycle, the pistons push idle gear portions 20a and 20b so idle gear portions 20a and 20b rotates about front wheel axle 12 and rear wheel axle 18 thereby lifting corresponding front wheels 14 or rear wheels 16. On the contrary, when pistons of front cylinder section 22 and rear cylinder section 24 carry out an compression cycle, the pistons pull idle gear portions 20a and 20b, so idle gear portions 20a and 20b reversely rotate about front wheel axle 12 and rear wheel axle 18 thereby descending corresponding front wheels 14 or rear wheels 16.

Other ends of front cylinder section 22 and rear cylinder sections 24 are respectively connected to first and second brackets 30a and 30b which are provided in the body. Front cylinder section 22 and rear cylinder section 24 are provided with a cylinder displacement detecting sensor 32, respectively. As shown in FIG. 7, one end of cylinder displacement detecting sensor 32 of front cylinder section 22 is coupled to bracket 30a together with one end of front cylinder section 22 and the other end of cylinder displacement detecting sensor 32 of front cylinder section 22 is coupled to front wheels 12 together with pistons of front cylinder section 22. Accordingly, cylinder displacement detecting sensor 32 is integrally mounted to the body with front cylinder section 22 and detects a displacement of front cylinder section 22 according to compression and expansion cycles of front cylinder section 22. Cylinder displacement detecting sensor 32 is also provided at rear cylinder section 24 and a steering cylinder 66 in order to detect the displacements thereof. Cylinder displacement detecting sensor 32 sends a displacement signal to a microcomputer 40 according to the compression and expansion cycles of front cylinder section 22 and rear cylinder section 24.

Front axles 26 are coupled to idle gear portions 20a which are rotatably coupled to front wheel axle 12, and steering cylinder 66 for steering front wheel 14 is coupled to front axle 26. Steering cylinder 66 is provided at a front of front axle 26 and has cylinder displacement detecting sensor 32 which detects the displacement of steering cylinder 66.

Similar to cylinder displacement detecting sensor 32 of front and rear cylinder sections 22 and 24, cylinder displacement detecting sensor 32 of steering cylinder 66 detects a displacement of the piston of steering cylinder 66 and sends a signal to microcomputer 40. Therefore, microcomputer 40 can determine the operating conditions of front cylinder section 22, rear cylinder section 24 and steering cylinder 66 based on the signal applied from cylinder displacement detecting sensor 32.

As shown in FIG. 1, a slope detecting sensor 38 for detecting an inclined angle of the body in the left, right, front and rear directions of the body is provided at one side of the body of tractor 10. Slope detecting sensor 38 sends a signal to microcomputer 40 based on the inclined degree of the body. That is, as shown in FIG. 4, if tractor 10 drives in the slope in the contour direction, the body is inclined in the left and right directions thereof, and, as shown in FIG. 6, if tractor 10 drives in the slope in the latitudinal direction, the body is inclined in the front and rear directions thereof.

In addition, if tractor 10 drives in the slope in the oblique direction, the body is inclined in the left, right, front and rear directions thereof.

After the body is inclined, slope detecting sensor 38 detects the inclined degree of the body and sends the signal to microcomputer 40. In this application, the term "contour direction" means a direction traversing the slope, the term "latitudinal direction" means a direction following the slope, and the term "oblique direction" means a direction between the contour direction and the latitudinal direction.

Upon receiving the signal applied from slope detecting sensor 38, microcomputer 40 analyzes the signal and determines the inclined direction of the body based on the signal so as to selectively operate hydraulic pressure supplying sections.

A driving circuit 42 for operating the body and steering cylinder 66 is connected to microcomputer 40, and a first hydraulic pressure supplying section 50 for controlling the movement of the body of tractor 10 and a second hydraulic pressure supplying section 60 for controlling the steering of tractor 10 are connected to driving circuit 42. Second hydraulic pressure supplying section 60 is connected to steering cylinder 66. First hydraulic pressure supplying section 50 is connected to both front cylinder section 22 and rear cylinder section 24. First hydraulic pressure supplying section 50 has two hydraulic pumps 52a and 52b for separately controlling front cylinder section 22 and rear cylinder section 24, four solenoid valves 54 for controlling a fluid flow, four check valves 56 and a plurality of safety valves 58 which are provided for the safety purpose.

As shown in FIG. 5, first hydraulic pressure supplying section 50 is provided with first hydraulic pump 52a which is installed in an oil tank 70 for supplying a pressurized oil into first and second front wheel cylinders 22a and 22b. In addition, first hydraulic pressure supplying section 50 is also provided with second hydraulic pump 52b for supplying oil into first and second rear wheel cylinders 24a and 24b. The oil supplying system for front cylinder section 22 is similar to the oil supplying system for rear cylinder section 24, so only the oil supplying system for front cylinder section 22 will be described below with reference to FIG. 5.

Hydraulic pump 52a for supplying oil into front cylinder section 22 is connected to a first solenoid valve 54a through a first pipe 72 and a first exhaust valve 55a is connected to a center of first pipe 72. First exhaust valve 55a controls the flow rate of oil which is supplied into first solenoid valve 54a through a first pipe 72. First front wheel cylinder 22a is connected to first solenoid valve 54a through second and third pipes 73 and 74, and first solenoid valve 54a controls the flow direction of oil which is supplied from hydraulic pump 52a into front and rear sides of a piston 36 which is a part of first front wheel cylinder 22a. That is, first solenoid valve 54a controls the flow direction of oil such that oil can flow into first front wheel cylinder 22a through second or third pipes 73 or 74. Check valve 56 and a fifth safety valve 58e are connected to a center of second pipe 73.

First solenoid valve 54a is connected to second solenoid valve 54b through a fourth pipe 75, and second solenoid valve 54b is connected to a seventh pipe 78 which allows oil to be exhausted into oil tank 70. A portion of first pipe 72 disposed between first exhaust valve 55a and hydraulic pump 52a is connected to fourth pipe 75 through a first safety valve 58a, and a portion of first pipe 72 disposed between first exhaust valve 55a and first solenoid valve 54a is connected to fourth pipe 75 through a second safety valve 58b. In addition, a second exhaust valve 55b for controlling an amount of oil supplied into second solenoid valve 54b is provided at a center of fourth pipe 75 and third and fourth safety valves 58c and 58d are connected at both ends of second exhaust valve 55b so as to allow fourth pipe 75 to be connected to seventh pipe 78.

Connected between second solenoid valve 54b and second front wheel cylinder 22b are fifth and sixth pipes 76 and 77. Check valve 56 and a sixth safety valve 58f are connected to a center of fifth pipe 76. Second solenoid valve 54b has a function identical to the function of first solenoid valve 54a, and oil supplied into first and second front wheel cylinders 22a and 22b by hydraulic pump 52a is exhausted into oil tank 70 through seventh pipe 78.

First and second front wheel cylinders 22a and 22b are respectively installed on front wheels 14 which are mounted at both front sides of the body, and first and second rear wheel cylinders 24a and 24b are respectively installed on rear wheels 16 which are mounted at both rear sides of the body.

One end of each front wheel cylinders 22a and 22b and rear wheel cylinders 24a and 24b is installed on first bracket 30a, and the piston of each front wheel cylinders 22a and 22b and rear wheel cylinders 24a and 24b is respectively installed on front wheel axle 12 and rear wheel axle 18. The center of the piston installed on front wheel axle 12 or rear wheel axle 18 is offset from the center of front wheel axle 12 or rear wheel axle 18.

Hereinafter, the operation of the present invention will be explained.

Firstly, when tractor 10 drives in the land with an automatic mode, slope detecting sensor 38 provided in the body detects the inclined degree of the body. If the body is inclined in one direction while tractor 10 is driving, slope detecting sensor 38 is also inclined thereby detecting the inclined degree of the body. Then, slope detecting sensor 38 sends the signal to microcomputer 40. Upon receiving the signal, microcomputer 40 operates corresponding hydraulic pump 52a or 52b and solenoid valve 54 so that the hydraulic pressure is applied to front cylinder section 22 or rear cylinder section 24, thereby adjusting the body of tractor 10 to the horizontal state. That is, the pipes for supplying oil into front cylinder section 22 and rear cylinder section 24 are filled up with oil, and solenoid valve 54 is opened by microcomputer 40 to allow the oil to flow into front cylinder section 22 or rear cylinder section 24.

For example, when the body is horizontally maintained by using first front wheel cylinder 22a, microcomputer 40 controls first solenoid valve 54 so that oil is supplied thereto through third pipe 74 and oil filled in first front wheel cylinder 22a is exhausted through second pipe 73.

Accordingly, oil supplied from hydraulic pump 52a through first pipe 72 is applied to first front wheel cylinder 22a through first solenoid valve 54 and third pipe 74, so the piston of first front wheel cylinder 22a is compressed. Oil provided in front of the piston of first front wheel cylinder 22a is exhausted into oil tank 70 through second, fourth, and seventh pipes 73, 75 and 78. Since the piston of first front wheel cylinder 22a is compressed, the front wheel axle of front wheel 14 is rotated by a predetermined degree so that the body of tractor 10 can be maintained in the horizontal state.

Figure 11:
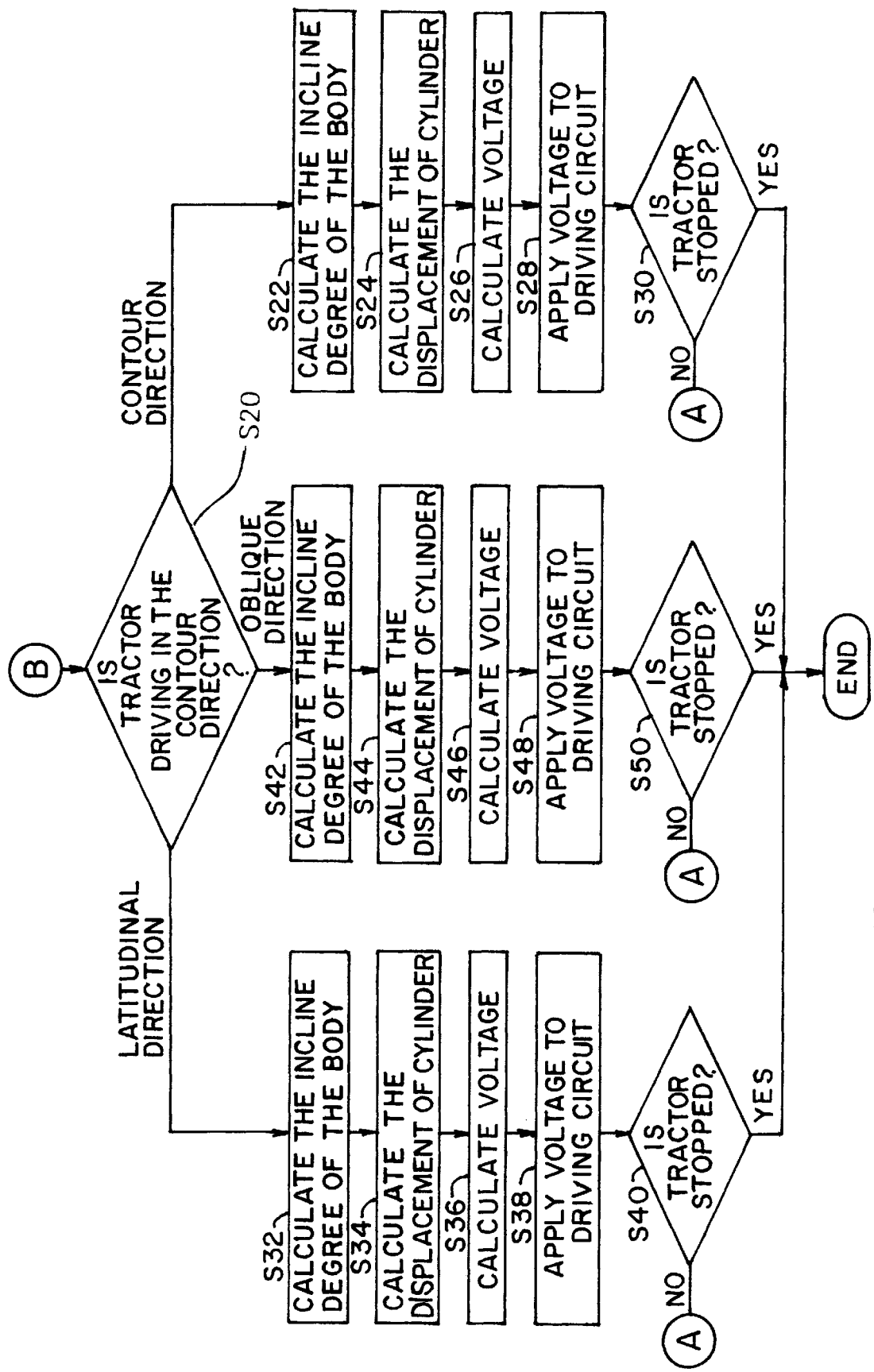
FIG. 11 is a flow chart showing another operating process of the tractor according to the present invention.

Referring to FIGS. 9–11, after operating tractor 10 (S10), the user selects the mode of tractor 10 (S12). If tractor 10 is in the manual mode, the user manually controls the height of the body with respect to the land and the horizontal position of the body (S14). If tractor 10 is in the automatic mode, microcomputer 40 determines whether the land, on which tractor 10 drives, is a flat land or a slope land (S16). If tractor 10 drives in the flat land, microcomputer 40 only adjusts the height of the body with respect to the land by handling a body level control button (S18). On the other hand, if tractor 10 drives in the slope land, microcomputer 40 determines the driving direction of tractor 10, i. e., contour direction, latitudinal direction or oblique direction (S20).

If tractor 10 drives in the contour direction, microcomputer 40 calculates the inclined angle of the body in the left and right directions thereof (S22). After that, microcomputer 40 calculates the displacement of front wheel cylinder 22 and rear wheel cylinder 24 in the left and right directions (S24). Then, microcomputer 40 converts the displacement value of front and rear cylinder sections 22 and 24 into a voltage value (S26), and sends the voltage to driving circuit 42 so that driving circuit 42 operates front and rear cylinder sections 22 and 24 thereby adjusting the body of tractor 10 to the horizontal position (S28).

After that, microcomputer 40 determines whether or not tractor 10 is still driving in the contour direction (S30). If tractor 10 still drives in the contour direction, the steps (S20–S28) are repeated.

If tractor 10 dives in the latitudinal direction, microcomputer 40 calculates the incline angle of the body of tractor 10 in front and rear directions thereof (S32). After calculating the incline angle, microcomputer 40 calculates displacements of front and rear cylinder sections 22 and 24 (S34).

Then, microcomputer 40 converts the displacement value to a voltage value (S36) and sends the voltage to driving circuit 42 (S38). After receiving the voltage, driving circuit 42 operates front and rear cylinder sections 22 and 24 thereby adjusting the body of tractor 10 to the horizontal position.

After that, microcomputer 40 determines whether or not tractor 10 is still driving in the latitudinal direction (S40). If tractor 10 still drives in the latitudinal direction, the steps (S32–S38) are repeated.

If tractor 10 drives in the oblique direction, microcomputer 40 calculates the incline angle of the body of tractor 10 in left, right, front and rear directions thereof (S42). After calculating the incline angle, microcomputer 40 calculates displacements of front and rear cylinder sections 22 and 24 (S44). Then, microcomputer 40 converts the displacement value to a voltage value (S46) and sends the voltage to driving circuit 42 (S48). After receiving the voltage, driving circuit 42 operates front and rear cylinder sections 22 and 24 thereby adjusting the body of tractor 10 to the horizontal position.

After that, microcomputer 40 determines whether or not tractor 10 is still driving in the oblique direction (S50). If tractor 10 still drives in the oblique direction, the steps (S42–S48) are repeated.

As mentioned above, the body of the tractor can be maintained to the horizontal position while the tractor is driving so that the user can comfortably drive the tractor.

In addition, the height of the body with respect to the ground can be adjusted according to the ground condition, so the crops can be prevented from making contact with the body of the tractor. Accordingly the crops can be prevented from being damaged.

In addition, the present invention can rapidly adjust the body of the tractor to the horizontal position.

While the present invention has been particularly shown and described with reference to the preferred embodiment thereof, it will be understood by those skilled in the art that various changes in form and detail may be effected therein without departing from the spirit and scope of the invention as defined by the appended claims.

What is claimed is:

1. A method of adjusting a body of a tractor to a horizontal position, the method comprising the steps of:

(1) determining whether the tractor is in an automatic mode or in a manual mode;

(2) operating the tractor with the manual mode if the tractor is in the manual mode in step (1);

(3) determining whether the tractor is in a flat land or in a slope land if the tractor is in the automatic mode in step (1);

(4) adjusting a height of the body of the tractor with respect to the ground by operating a height button according to a ground condition if the tractor is in the flat land in step (3);

(5) determining a driving direction of the tractor if the tractor drives in the slope land in step (3);

(6) adjusting the body to the horizontal position by controlling the body in left and right directions thereof if the tractor is driving in a contour direction in step (5);

(7) adjusting the body to the horizontal position by controlling the body in front and rear directions thereof if the tractor is driving in a latitudinal direction in step (5); and (8) adjusting the body to the horizontal position by controlling the body in left, right, front and rear directions thereof if the tractor is driving in an oblique direction in step (5).

2. The method as claimed in claim 1, wherein step (6) comprises the substeps of:

(i) measuring an inclined angle of the body in left and right directions thereof by using a slope detecting sensor;

(ii) calculating displacements of first and second cylinders which are provided at front and rear wheel axles;

(iii) converting a displacement value into a voltage;

(iv) sending the voltage to a driving circuit thereby selectively operating first and second cylinders so as to allow the body of the tractor to be maintained in the horizontal position;

(v) determining whether or not the tractor still drives in the contour direction; and (vi) repeating substeps (i) to (iv) if the tractor still drives in the contour direction in step (v).

3. The method as claimed in claim 1, wherein step (7) comprises the substeps of:

(i) measuring an inclined angle of the body in front and rear directions thereof by using a slope detecting sensor;

(ii) calculating displacements of first and second cylinders which are provided at front and rear wheel axles;

(iii) converting a displacement value to a voltage;

(iv) sending the voltage to a driving circuit thereby selectively operating first and second cylinders so as to allow the body of the tractor to be maintained in the horizontal position;

(v) determining whether or not the tractor still drives in the latitudinal direction; and (vi) repeating substeps (i) to (iv) if the tractor still drives in the latitudinal direction in step (v).

4. The method as claimed in claim 1, wherein step (8) comprises the substeps of:

(i) measuring an inclined angle of the body in left, right, front and rear directions thereof by using a slope detecting sensor;

(ii) calculating displacements of first and second cylinders which are provided at front and rear wheel axles;

(iii) converting a displacement value to a voltage;

(iv) sending the voltage to a driving circuit thereby selectively operating first and second cylinders so as to allow the body of the tractor to be maintained in the horizontal position;

(v) determining whether or not the tractor still drives in the oblique direction; and (vi) repeating substeps (i) to (iv) if the tractor still drives in the oblique direction in step (v).

5. An apparatus for adjusting a body of a tractor to a horizontal position, the apparatus comprising:

a driving circuit generating an electric signal for operating the body and a steering cylinder;

a first hydraulic pressure supplying section connected to the driving circuit for controlling the body of the tractor;

a second hydraulic pressure supplying section connected to the driving circuit for controlling a driving direction of the tractor;

a front cylinder section including a first front wheel cylinder and a second front wheel cylinder, the front cylinder section being connected to the first hydraulic pressure supplying section, the first front wheel cylinder being disposed between a first idle gear portion which is rotatably coupled to a first end of a front wheel axle and a first end of a first bracket horizontally installed on a front portion of the body, the second front wheel cylinder being disposed between a second idle gear portion which is rotatably coupled to a second end of the front wheel axle and a second end of the first bracket;

a rear cylinder section including a first rear wheel cylinder and a second rear wheel cylinder, the rear cylinder section being connected to the first hydraulic pressure supplying section, the first rear wheel cylinder being disposed between a third idle gear portion which is rotatably coupled to a first end of a rear wheel axle and a first end of a second bracket horizontally installed on a rear portion of the body, the second rear wheel cylinder being disposed between a fourth idle gear portion which is rotatably coupled to a second end of the rear wheel axle and a second end of the second bracket;

a steering cylinder which is connected to second hydraulic pressure supplying section and is installed on a front portion of the front wheel axle;

a slope detecting sensor provided at the body, the slope detecting sensor detecting an incline of the body according to a ground condition;

cylinder displacement detecting sensors installed at both front and rear cylinder sections for detecting displacements thereof; and a microcomputer which is installed in the body and is connected to the cylinder displacement detecting sensors and the slope detecting sensor for controlling the operations of the steering cylinder and the front and rear cylinder sections.

6. The apparatus as claimed in claim 1, wherein the first hydraulic pressure supplying section comprises:

a hydraulic pump installed in an oil tank for supplying a pressurized oil to the front and rear cylinder sections;

an exhaust valve connected to the hydraulic pump through a first pipe for adjusting a flow rate of the oil which flows into the front and rear cylinder sections through the first pipe; and a solenoid valve assembly connected to the exhaust valve by second and third pipes for allowing the oil supplied from the hydraulic pump to flow into front and rear portions of pistons which are parts of front and rear cylinder sections.

7. The apparatus as claimed in claim 6, wherein the solenoid valve assembly and the exhaust valve are installed at first and second front wheel cylinders, respectively, and each solenoid valve assembly and exhaust valve receives the oil from the hydraulic pump.

8. The apparatus as claimed in claim 6, wherein at least one of second and third pipes has a check valve and a first safety valve.

9. The apparatus as claimed in claim 8, wherein front and rear portions of the exhaust valve of the first front wheel cylinder are connected to the second front wheel cylinder through the safety valve so that the oil supplied to the first front wheel cylinder flows into the second front wheel cylinder through the first safety valve.

10. The apparatus as claimed in claim 9, wherein a second safety valve connected to an exhaust pipe is connected to front and rear portions of the exhaust valve of the second front wheel cylinder which is connected to the exhaust valve of the first front wheel cylinder through the first safety pipe, so that the oil is exhausted into the oil tank when a pressure of oil exceeds a predetermined level.

11. The apparatus as claimed in claim 5, wherein the first hydraulic pressure supplying section comprises:

a hydraulic pump installed in an oil tank for supplying a pressurized oil to the first and second rear wheel cylinders;

an exhaust valve connected to the hydraulic pump through a pipe for adjusting a flow rate of the oil which flows into the rear cylinder section through the pipe; and a solenoid valve assembly connected to the exhaust valve by the pipe for allowing the oil supplied from the hydraulic pump to flow into front and rear portions of pistons which are parts of the rear cylinder section.

12. The apparatus as claimed in claim 5, wherein a first end of each cylinder displacement detecting sensor is connected to the first bracket together with one end of each first and second front wheel cylinders, and a second end of each cylinder displacement detecting sensor is connected to the front wheel axle together with the piston of each first and second front wheel cylinders, so that cylinder displacement detecting sensor moves according to a stroke of pistons thereby exactly detecting the displacement of the front cylinder section, the cylinder displacement detecting sensor sending a displacement data of the front cylinder section to the microcomputer.

13. The apparatus as claimed in claim 5, wherein pistons of the front and rear cylinder sections are connected to the idle gear portions, respectively, in such a manner that centers of pistons are offset from centers of the front and rear wheel axles, and the second ends of the front and rear cylinder sections are coupled to first and second brackets, respectively.

14. The apparatus as claimed in claim 5, wherein the idle gear portions coupled to the front wheel axle are provided therein with ball bearings so that a rotation of idle gear is facilitated.

* * * * *